(12) United States Patent
Anderson

(10) Patent No.: US 7,887,275 B2
(45) Date of Patent: Feb. 15, 2011

(54) BALE HANDLING VEHICLE

(76) Inventor: David Verner Anderson, P.O. Box 68, Burr Oak, KS (US) 66936

( * ) Notice: Subject to any disclaimer, the term of this patent is extended or adjusted under 35 U.S.C. 154(b) by 312 days.

(21) Appl. No.: 12/107,189

(22) Filed: Apr. 22, 2008

(65) Prior Publication Data
US 2008/0267740 A1 Oct. 30, 2008

Related U.S. Application Data

(60) Provisional application No. 60/926,209, filed on Apr. 24, 2007.

(51) Int. Cl.
A01D 90/08 (2006.01)
(52) U.S. Cl. ............... 414/111; 414/789.7; 414/397
(58) Field of Classification Search ............ 119/845, 119/846; 414/111, 132, 24.5, 373, 397, 409, 414/467, 486, 501, 537, 555, 789.7, 789.8, 414/790.5, 790.6, 793.4, 795.2; 56/16.6, 56/474, 476, 480; 60/413
See application file for complete search history.

(56) References Cited

U.S. PATENT DOCUMENTS

| 2,726,115 | A | * | 12/1955 | Babcock et al. ........ 298/23 MD |
| 3,575,310 | A | * | 4/1971 | Albertson .................. 414/505 |
| 3,727,370 | A | * | 4/1973 | Lassig ......................... 53/540 |
| 4,952,111 | A | | 8/1990 | Callahan |
| 4,971,504 | A | | 11/1990 | Klompien |
| 5,320,472 | A | | 6/1994 | Matlack et al. |
| 5,333,981 | A | * | 8/1994 | Pronovost et al. ......... 414/24.5 |
| 5,380,140 | A | * | 1/1995 | Johnson .................... 414/421 |
| 5,397,208 | A | | 3/1995 | Siebenga |
| 5,431,525 | A | * | 7/1995 | Scott .......................... 414/538 |
| 5,478,194 | A | | 12/1995 | Tilley et al. |
| 5,507,612 | A | | 4/1996 | Siebenga |
| 5,697,758 | A | | 12/1997 | Tilley |
| 5,725,346 | A | | 3/1998 | Davina |
| 5,758,481 | A | * | 6/1998 | Fry ............................. 56/474 |
| 5,882,163 | A | | 3/1999 | Tilley |
| 5,899,652 | A | * | 5/1999 | Graham .................... 414/24.5 |
| 6,079,926 | A | | 6/2000 | Cox et al. |
| 6,171,047 | B1 | | 1/2001 | Vandervalk |
| 6,247,885 | B1 | | 6/2001 | Smart |
| 6,688,834 | B1 | * | 2/2004 | Aulick ....................... 414/469 |

(Continued)

FOREIGN PATENT DOCUMENTS

WO    WO 0285099 A1 * 10/2002

Primary Examiner—Gregory W Adams
(74) Attorney, Agent, or Firm—Jeffrey L. Thompson; Thompson & Thompson, P.A.

(57) ABSTRACT

A bale handling vehicle includes a wheeled chassis having a cab, a frame, a plurality of wheels, and a bale handling system attached to the frame. The bale handling system includes a base frame, a bale gripper structure at the front of the vehicle for picking up bales, a first platform above the vehicle cab for receiving bales from the bale gripper structure, and a second platform positioned behind the first platform. The second platform includes a movable portion that can be raised to a vertical position for stacking the bales. The first platform is movable between a lowered position for receiving the bales from the bale gripper structure, and a raised position for causing the bales to slide rearwardly onto the second platform. Intermediate stop members are movable to selectively block the bales from sliding onto the movable portion of the second platform.

23 Claims, 8 Drawing Sheets

U.S. PATENT DOCUMENTS

| | | |
|---|---|---|
| 6,997,663 B2 | 2/2006 | Siebenga |
| 7,090,456 B2 | 8/2006 | Ost et al. |
| 2006/0245880 A1 * | 11/2006 | Priepke .................. 414/501 |

* cited by examiner

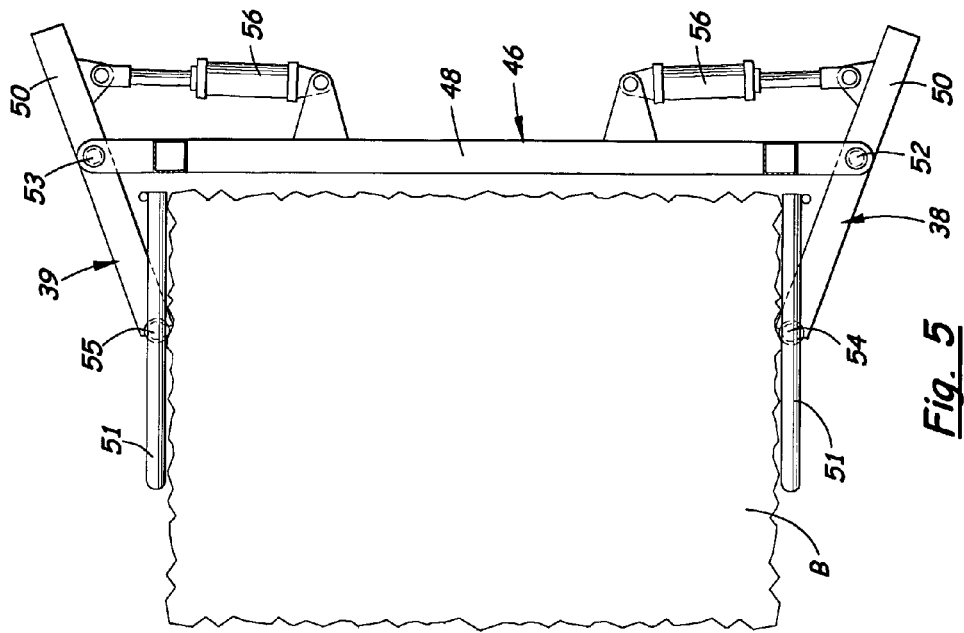
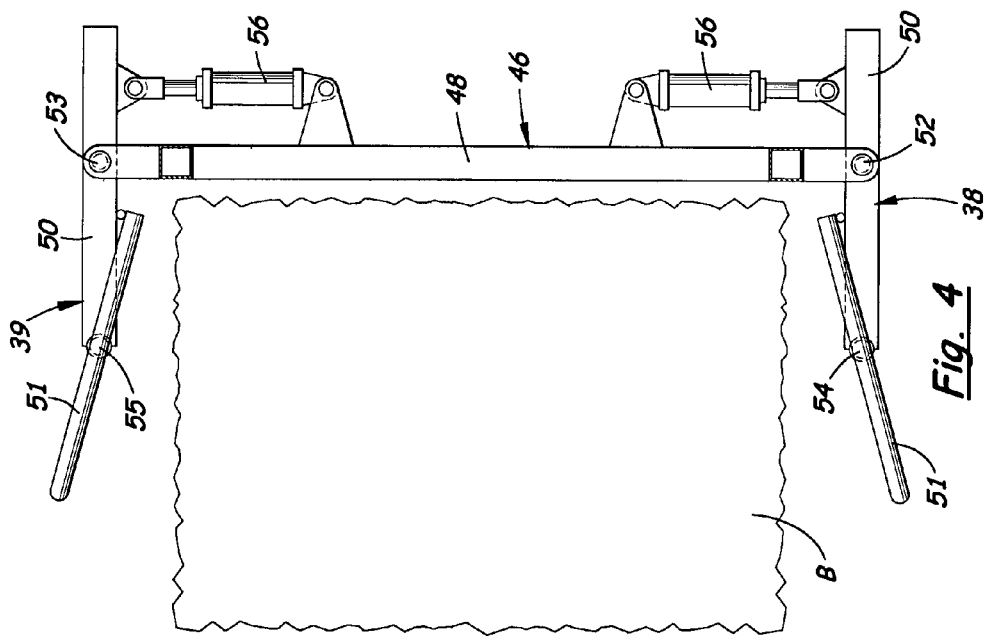

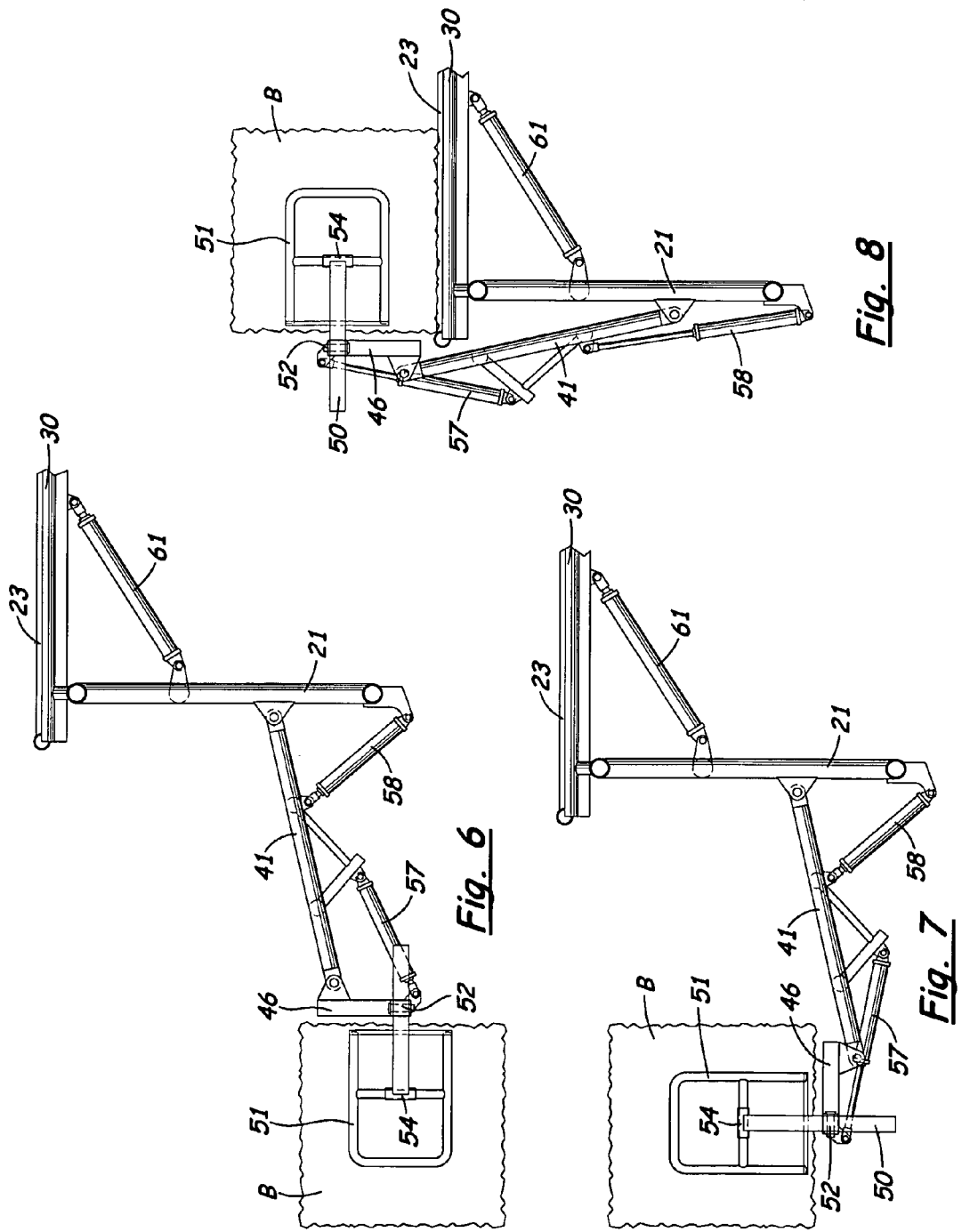

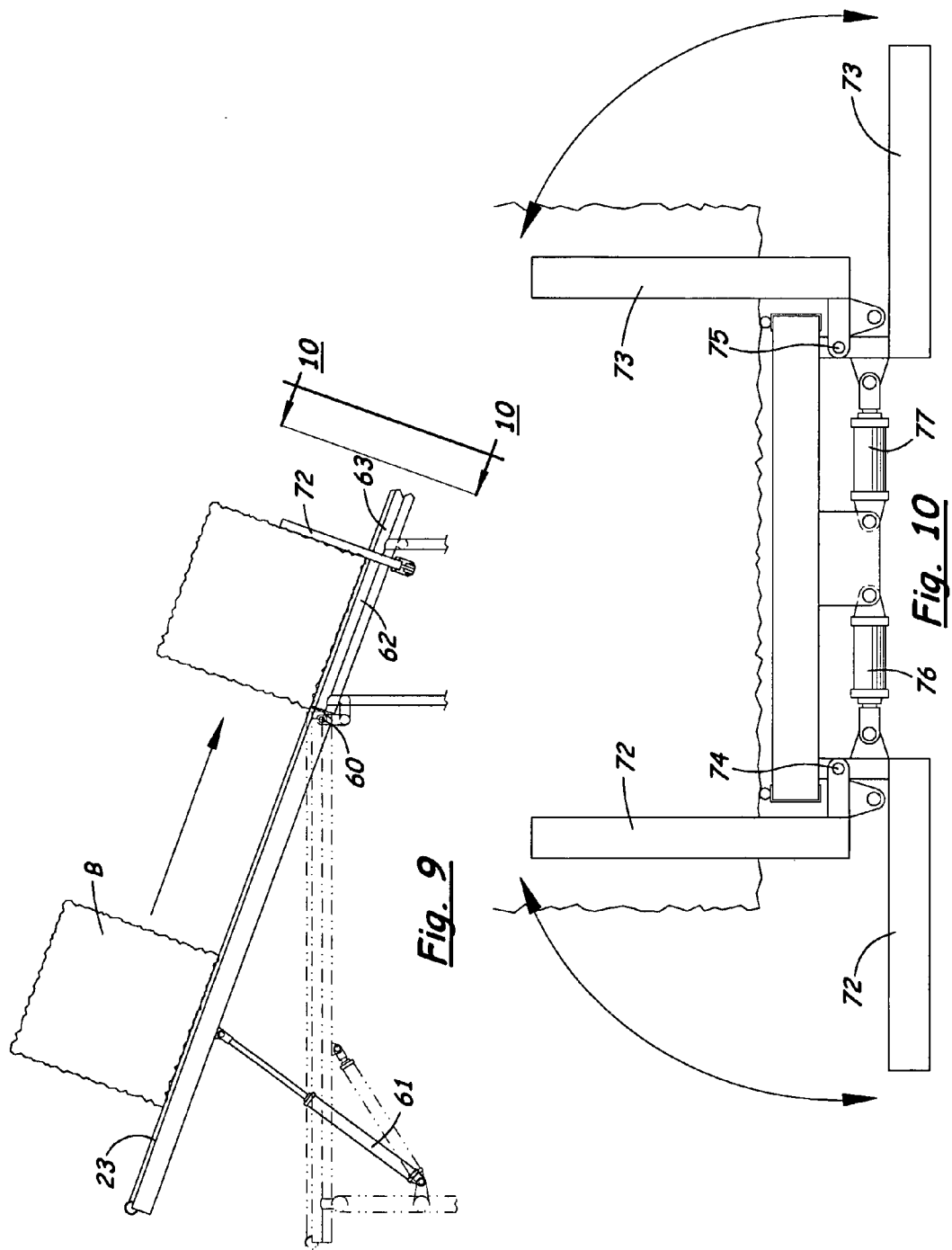

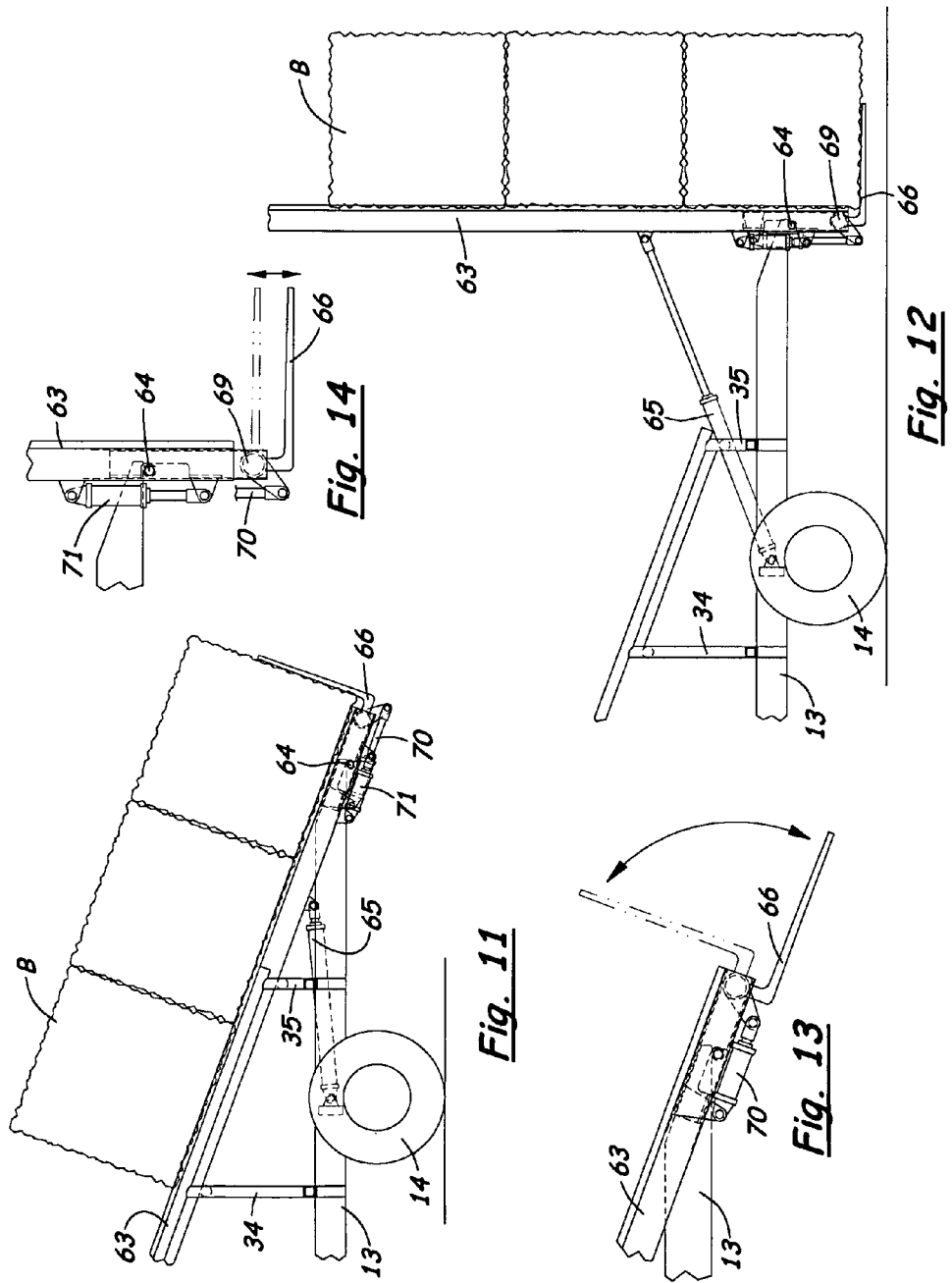

BALE HANDLING VEHICLE

RELATED APPLICATIONS

This application claims priority of U.S. Provisional Application No. 60/926,209 filed on Apr. 24, 2007. The entire content of this prior application is hereby incorporated by reference.

BACKGROUND OF THE INVENTION

1. Field of the Invention

The present invention relates generally to material handling and land vehicles. In particular, the present invention relates to a wheeled vehicle equipped with a bale handling system for retrieving, transporting, and stacking hay bales.

2. Description of the Related Art

Conventional methods of harvesting hay for livestock feed involve cutting the hay, baling the hay, removing the baled hay from fields, and storing the baled hay in stacks. To obtain the maximum production from a field of hay, it is important that all of these harvesting steps are performed in a timely and efficient manner.

A number of machines have been developed for retrieving, transporting and stacking hay bales. For example, U.S. Pat. No. 5,320,472 issued to Matlack et al. discloses a bale loading and transporting vehicle that can be used to load, transport and unload large rectangular or round bales from a hay field. The hay bales are loaded onto the vehicle by a front bale loader that raises the bales from the field and places them at the highest part of an inclined platform that slopes from the front of the vehicle to the rear. The bales are then discharged from the rear by pivoting a rear bale gate to a lower discharge position and allowing the bales to slide from the rear end of the inclined platform.

U.S. Pat. No. 4,952,111 issued to Callhan and U.S. Pat. No. 4,971,504 issued to Klompien both disclose devices for picking up and stacking large hay bales. These devices both include pickup forks at the front end of a vehicle for placing the bales on a stacking bed. Once the stacking bed is full, it can be pivoted to a vertical position for stacking the bales.

U.S. Pat. No. 7,090,456 issued to Ost et al. discloses a hay bale stacker having front pickup forks that lift the bales at the front of the vehicle, raise the bales over the cab of the vehicle, and place the bales on a platform that slopes downwardly toward the rear of the vehicle. The bales are rotated approximately 90 degrees as they are lifted and placed on the vehicle platform. A catch means for the bales is provided to control the bale's movement down the sloped bed as the bales are loaded. The platform can be tilted to a near vertical position to stack the loaded bales on the ground.

The bale handling vehicles described above are presumably suitable for their intended purposes. However, these bale handling vehicles have a limited capacity because the sloped platform creates a high center of gravity when fully loaded with hay bales, which can make the vehicle unstable as it moves across a field. The bale handling vehicles are also limited in their unloading options.

SUMMARY OF THE INVENTION

A bale handling vehicle according to the present invention includes a wheeled chassis having a cab, a frame, a plurality of wheels, and a bale handling system attached to the frame. The bale handling system includes a base frame, a bale gripper structure at the front of the vehicle for picking up bales, a first platform above the vehicle cab for receiving bales from the bale gripper structure, and a second platform positioned behind the first platform. The second platform includes a movable portion that can be raised to a vertical position for stacking the bales. The first platform is movable between a lowered position for receiving the bales from the bale gripper structure, and a raised position for causing the bales to slide rearwardly onto the second platform. Intermediate stop members are movable to selectively block the bales from sliding onto the movable portion of the second platform.

According to a broad aspect of the present invention, a bale handling vehicle is provided, comprising: a bale gripper structure at the front of the vehicle for picking up bales; a first platform on which bales are deposited by the bale gripper structure, the first platform having a first position for receiving bales from the bale gripper structure and a second position in which the first platform is inclined at an angle that causes bales to slide rearwardly across the first platform; and a second platform positioned behind the first platform, the second platform having a first position for receiving bales from a rear end of the first platform and a second position for stacking the bales in a vertical stack on top of each other.

According to another broad aspect of the present invention, a method of retrieving bales of agricultural crop material from a field is provided, comprising: providing a bale handling vehicle having a bale gripper structure at a front of the vehicle for picking up bales, a first platform on which bales are deposited by the bale gripper structure, and a second platform positioned behind the first platform; operating the bale gripper structure to grip, rotate, and lift a bale to a position over said first platform, and then to release the bale onto the first platform; and raising a front end of the first platform to cause the bale to slide rearwardly onto the second platform.

Numerous other objects of the present invention will be apparent to those skilled in this art from the following description wherein there is shown and described an embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the present invention is made with reference to the accompanying drawings. In the drawings:

FIG. 4 is a plan view of a bale gripper structure at the front of the bale handling vehicle, in an open position.

FIG. 5 is a plan view of the bale gripper structure in a closed position.

FIG. 6 is a side view of the bale gripper structure and the linkage mechanism associated therewith at the start of a bale lifting process.

FIG. 7 is a side view of the bale gripper structure and linkage mechanism at an intermediate point in the bale lifting process.

FIG. 8 is a side view of the bale gripper structure and linkage mechanism at the end of the bale lifting process as the bale is placed on the first platform.

FIG. 9 is a side view of a portion of the vehicle showing the first platform in its raised position.

FIG. 10 is a rear view of a portion of the vehicle as viewed along line 10-10 in FIG. 9, showing a pair of intermediate stop members that can be selectively moved into a path of movement of the bales along the second platform.

FIG. 11 is a side view of a rear portion of the vehicle showing a plurality of bales carried on a movable portion of the second platform.

FIG. 12 is a side view of the rear portion of the vehicle showing the movable portion of the second platform in a raised position for stacking the bales in a vertical stack on top of each other.

FIG. 13 is a side view showing a rear stop structure that can be rotated between a raised position (shown in dotted lines) and a lowered position.

FIG. 14 is a side view showing a sliding movement of the rear stop structure with the movable portion of the second platform in its raised position to set the bottom bale on the ground.

DETAILED DESCRIPTION OF THE INVENTION

Figure 1:
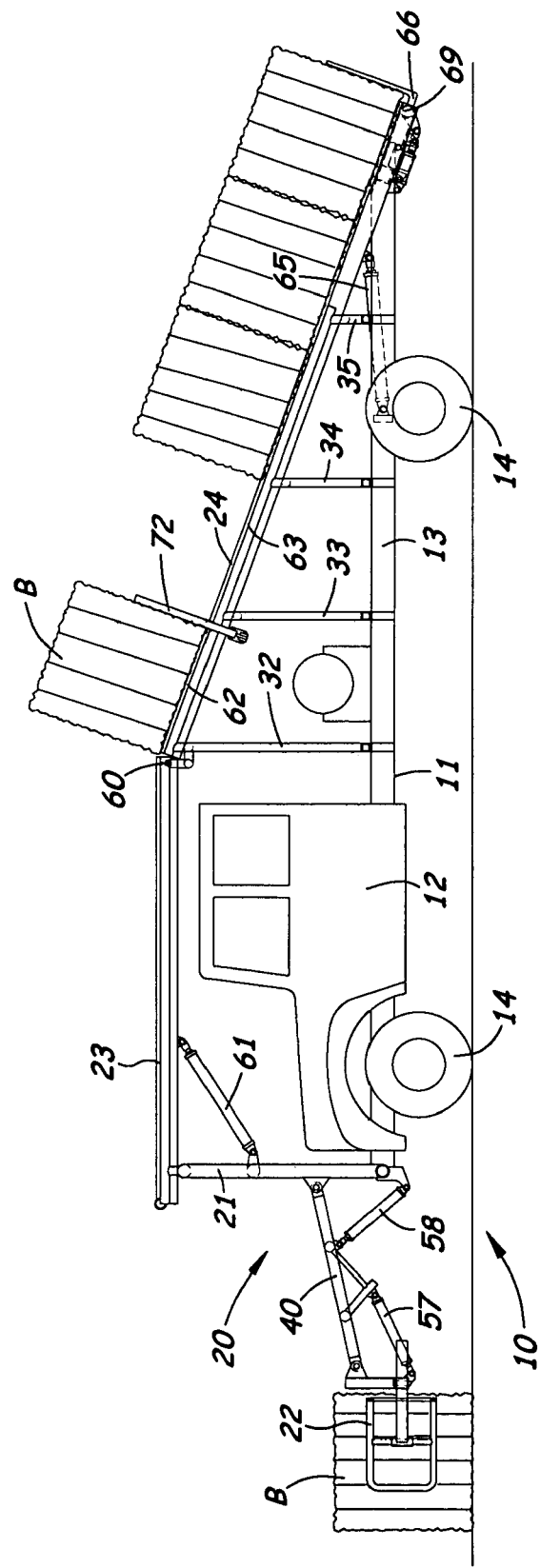
FIG. 1 is a side elevation view of a bale handling vehicle according to the present invention.

A bale handling vehicle 10 according to the present invention will now be described in detail with reference to FIGS. 1 to 14 of the accompanying drawings.

The bale handling vehicle 10 of the present invention includes a wheeled chassis 11 having a cab 12, a frame 13, a plurality of wheels 14, and various other conventional motor vehicle components. In one embodiment, the invention is made by retrofitting a chassis of a passenger bus, such as a used school bus, by removing the passenger seating area and attaching a bale handling system 20 to the frame 13 in front of and behind the cab 12. In another embodiment, the bale handling system 20 is installed on a new chassis.

The bale handling system 20 includes a base frame 21, a bale gripper structure 22 at the front of the vehicle 10 for picking up bales B, a first platform 23 above the vehicle cab 12 for receiving bales from the bale gripper structure 22, and a second platform 24 located behind the first platform 23. These components of the bale handling system 20 will each be explained in detail below.

Figure 2:
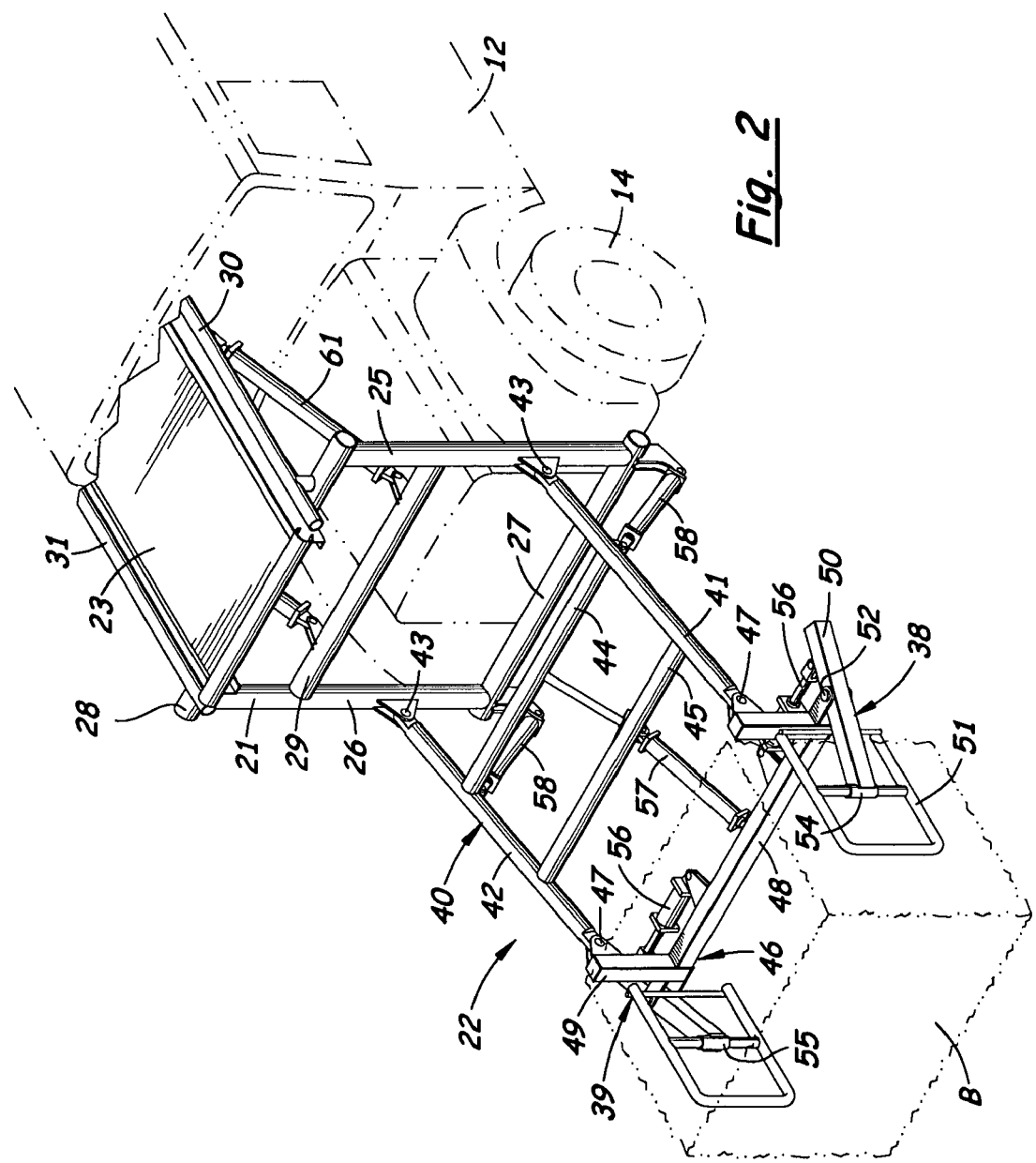
FIG. 2 is a front perspective view of a front portion of the bale handling vehicle.

The base frame 21 is attached to the front end of the vehicle frame 13 and to additional locations along the vehicle frame 13 behind the cab 12. As shown in FIG. 2, the base frame 21 includes first and second upstanding frame members 25, 26 positioned on the right and left sides of the vehicle 10, a lower cross member 27 extending between the lower ends of the upstanding frame members 25, 26, an upper cross member 28 extending between the upper ends of the upstanding frame members 25, 26, and an intermediate cross member 29 extending between the upstanding frame members 25, 26 at an intermediate location. The cross members 28, 29 and upstanding frame members 25, 26 are preferably arranged to minimize obstructions of the driver's view from the cab 12 of the vehicle 10. The lower cross member 27 is attached to the front end of the vehicle frame 13 by bolts or welding or other suitable means.

Figure 3:
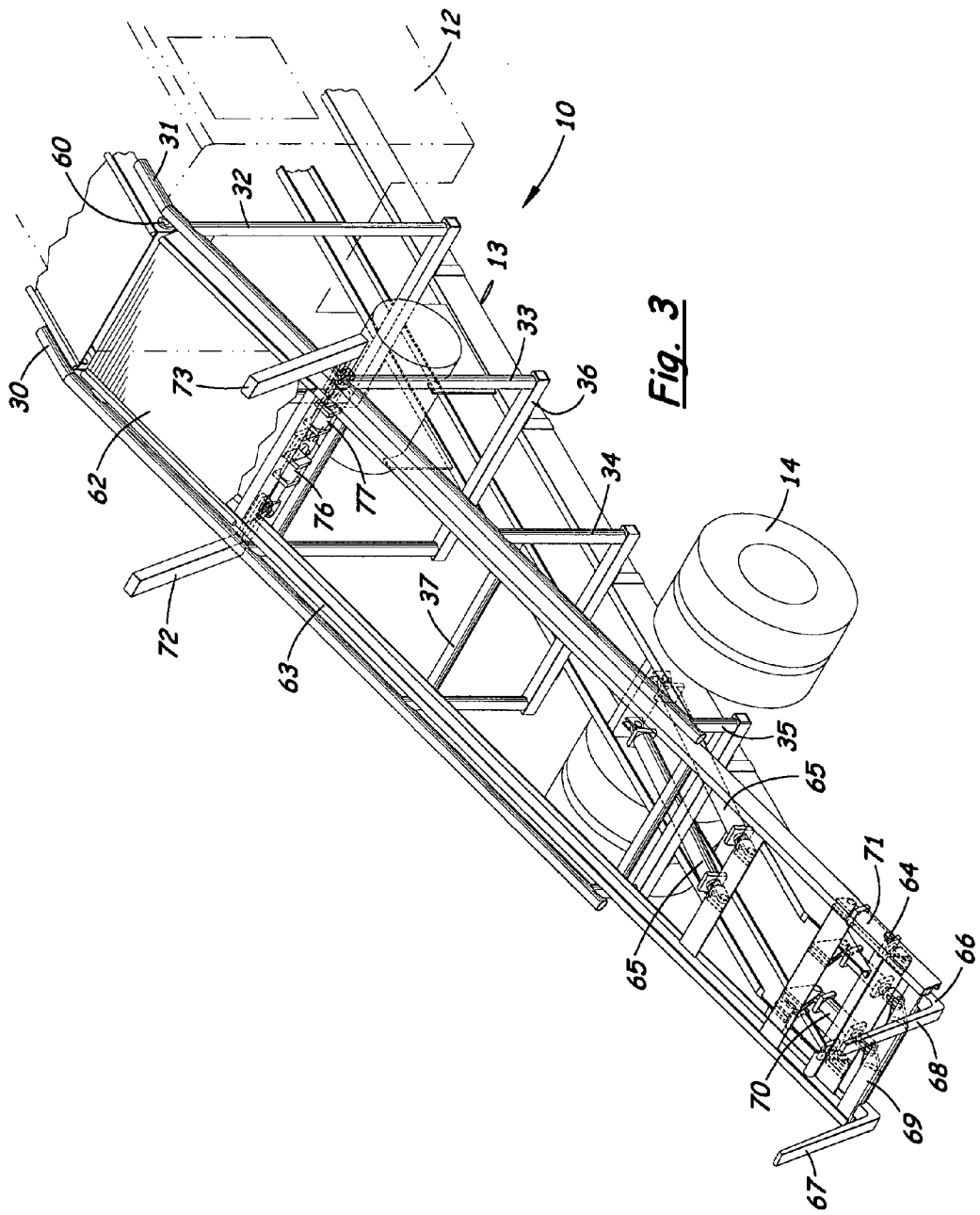
FIG. 3 is a rear perspective view of a rear portion of the bale handling vehicle.

Right and left base frame members 30, 31 extend from the respective right and left sides of the upper cross member 28 rearwardly to additional sets of upstanding frame members 32-35 located behind the cab 12. As shown in FIG. 3, the additional sets of upstanding frame members 32-35 may comprise four pairs of upstanding frame members spaced along the length of the vehicle frame 13. Lower cross members 36 can be used to support the additional upstanding frame members 32-35 on the vehicle frame 13. The lower cross members 36 can be attached to the vehicle frame 13 by bolts, welding or other suitable means. Additional cross members 37 are provided between the upstanding frame members 32-35 to strengthen the base frame 21.

The right and left base frame members 30, 31 extend in a generally longitudinal direction of the vehicle 10 and are attached to the upper ends of the upstanding frame members 25, 26, and 32-35. The right and left base frame members 30, 31 are substantially horizontal over the cab 12 and are inclined downwardly and rearwardly behind the cab 12.

The bale gripper structure 22 is provided at the front of the vehicle 10 for picking up bales B. The bale gripper structure 22 includes a pair of bale grippers 38, 39 positioned on the right and left sides of the bale handling system 20. The bale grippers 38, 39 are supported by a linkage mechanism 40 having a plurality of actuators operable to squeeze, lift, rotate, and place the bales B on the first platform 23 above the cab 12 of the vehicle 10. The linkage mechanism 40 includes right and left arms 41, 42 rotatably attached to the first and second upstanding frame members 25, 26, respectively, for pivoting movement about a transverse horizontal axis 43. Support members 44, 45 extend between the right and left arms 41, 42 to strengthen the assembly and ensure that the arms 41, 42 move in unison with each other.

A gripper support 46 is rotatably attached to the front ends of the right and left arms 41, 42 for pivoting movement about a transverse horizontal axis 47. The gripper support 46 includes a cross piece 48 and short upstanding members 49.

The bale grippers 38, 39 each include a rocking arm 50 and a grapple 51 for engaging and gripping the bales B to be handled. The grapples 51 in the illustrated embodiment have a generally rectangular configuration for contacting the bales B. However, it will be understood that the grapples 51 can have different shapes and/or sizes to better adapt to the particular types of bales being handled.

The rocking arms 50 are rotatably attached to the right and left ends of the gripper support 46 for pivoting movement about their respective axes 52, 53, which are perpendicular to the transverse horizontal axis 47 of the gripper support 46. As shown in FIG. 2, the axes of rotation 52, 53 for the rocking arms 50 are generally vertical at the start of the bale lifting process. The grapples 51 are rotatably attached to the rocking arms 50 for rotation about axes 54, 55 that are parallel with the axes of rotation 52, 53 of the rocking arms 50.

The linkage mechanism 40 has a first set of hydraulic actuators 56 for moving the rocking arms 50 about their respective axes 52, 53, which in turn moves the grapples 51 toward and away from one another. At the start of the bale lifting process, the first set of hydraulic actuators 56 are extended to cause the grapples 51 of the bale grippers 38, 39 to move toward one another for squeezing a bale B therebetween. The grapples 51 are self-adjusting to lay flat against the end surface of the bale B by rotation about the axes 54, 55 relative to the rocking arms 50. The first set of hydraulic actuators 56 are also arranged to self-center the bale B as the bale is being squeezed and lifted.

A second hydraulic actuator 57 is provided for pivoting the gripper support 46 relative to the right and left arms 41, 42. The second hydraulic actuator 57 is operable to pivot the gripper support 46 and bale grippers 38, 39 about the transverse horizontal axis 47 to lift and rotate the bale B approximately 90 degrees.

A third set of hydraulic actuators 58 are provided for pivoting the right and left arms 41, 42 relative to the base frame 21. The third hydraulic actuators 58 are operable to pivot the right and left arms 41, 42 along with the rest of the linkage mechanism 22 carried by the arms 41, 42 about the transverse horizontal axis 43 to lift and rotate the bale B an additional approximately 90 degrees and to position the bale over the first platform 23 above the cab 12.

In operation, the first, second and third actuators 56-58 are operated in sequence to squeeze and grip the bale B using the first actuators 56, lift and rotate the bale 90 degrees using the second actuator 57, and continue lifting and rotating the bale an additional 90 degrees using the third actuators 58. The hydraulic actuators 56-58 can be operated individually using separate manual control valves, or the hydraulic actuators can be operated automatically in a desired sequence using a suitable hydraulic or electronic sequencing control.

The first platform 23 above the cab 12 receives the bales B picked up by the bale gripper structure 22. The first platform 23 is rotatably attached to the base frame 21 for movement about a transverse horizontal axis 60 located near the rear end of the first platform 23. The first platform 23 has a first lowered position, as shown in FIG. 1, in which the platform 23 is substantially horizontal for receiving bales from the bale gripper structure 22. The first platform 23 has a second raised position, as shown in FIG. 9, in which the front end of the platform 23 is raised using hydraulic actuators 61 that extend between the base frame 21 and the first platform 23. The hydraulic actuators 61 cause the first platform 23 to rotate about the axis of rotation 60 at the rear end of the first platform 23. In the raised position, the first platform 23 is inclined at an angle that causes the bales to slide rearwardly across the first platform 23 and onto the second platform 24.

In operation, bales are deposited by the bale gripper structure 22 onto the first platform 23 one at a time with the first platform 23 in its lowered position. The pivoting action of the right and left arms 41, 42 of the linkage mechanism 40 is such that the bales carried on the first platform 23 are pushed rearwardly by each new bale deposited on the first platform 23. The lower position of the first platform 23 allows the bale gripper structure 22 and its linkage mechanism 40 to be more compact. The lower position of the first platform 23 also minimizes the height of the vehicle 10 during field operations and transport to provide a lower center of gravity and improved stability during operation. The raised position of the first platform 23 provides a convenient way to move the bales rearwardly along the vehicle 10 during unloading and stacking operations.

The second platform 24 positioned behind the first platform 23 has a stationary portion 62 and a movable portion 63. The front end of the stationary portion 62 of the second platform 24 is located adjacent to the rear end of the first platform 23, and a rear end of the stationary portion 62 is located adjacent to a front end of the movable portion 63 of the second platform 24. The movable portion 63 of the second platform 24 extends to the rear end of the vehicle 10.

The movable portion 63 of the second platform 24 has a first lowered position (FIGS. 1, 3 and 11) for receiving bales that slide rearwardly from the first platform 23, and a second raised position (FIG. 12) for stacking the bales in a vertical stack on top of each other. The movable portion 63 is inclined downwardly from front to rear in its first position and is substantially vertical in its second position. The movable portion 63 of the second platform 24 is rotatable about a transverse horizontal axis 64 located near the rear end of the second platform 24. The second platform 24 is moved from its first lowered position to its second raised position by raising a front end of the movable portion 63 of the second platform 24 to rotate the movable portion 63 about its axis 64. Hydraulic actuators 65 extending between the base frame 21 or the vehicle frame 13 and the movable portion 63 of the second platform 24 are used to raise and lower the movable portion 63.

A rear stop structure 66 is provided at the rear end of the second platform 24. The rear stop structure 66 includes a pair of rear forks 67, 68 that are rotatable between a first raised position (FIG. 11) for preventing bales from sliding off the rear of the second platform 24, and a second lowered position (FIG. 13) in which the bales can be slid off the rear of the second platform 24 for unloading. The rear forks 67, 68 are rotatable through an angle of approximately 90 degrees or more between the first raised position and the second lowered position.

The rear stop structure 66 is also slidable relative to the second platform 24. That is, the axis of rotation 69 of the rear forks 67, 68 is slidable relative to the second platform 24. This allows the rear forks 67, 68 to be lowered (or raised) to set the bottom bale on the ground when the second platform 24 is in its substantially vertical second position, as shown in FIGS. 12 and 14.

The rear stop structure 66 is pivotally moved between its raised and lowered positions by a first set of hydraulic actuators 70, and is slidably moved relative to the second platform 24 by a second set of hydraulic actuators 71. At least one of the sets of hydraulic actuators 70, 71 is connected to a hydraulic accumulator (not shown) that allows the hydraulic actuators 70, 71 to move upon impact. By having an accumulator associated with the hydraulic actuators 70, 71, the rear stop structure 66 can better absorb an impact of a bale sliding into the rear forks 67, 68 during operation.

Intermediate stop members 72, 73 are provided on the right and left sides of the second platform 24 near the transition point between the stationary and movable portions 62, 63 of the second platform 24. The intermediate stop members 72, 73 are each rotatably mounted for rotation about respective axes 74, 75 extending generally in the longitudinal direction of the second platform 24. The intermediate stop members 72, 73 are selectively movable between a first position in which the stop members 72, 73 are disposed outside the path of movement of the bales along the second platform 24, and a second position in which the stop members are disposed in the path of movement of the bales. In the first position of the stop members 72, 73, the bales are allowed to move along the second platform 24. In the second position, the stop members 72, 73 block movement of the bales from the stationary portion 62 of the second platform 24 to the movable portion 63. Hydraulic actuators 76, 77 are connected between the base frame 13 and the intermediate stop members 72, 73 for selectively moving the intermediate stop members 72, 73 during operation.

In operation, the bale handling vehicle 10 can be driven across a hay field to retrieve bales B that are left in the field by a hay baler. The bale handling vehicle 10 is driven toward each bale B until the bale is positioned between the right and left sides of the bale gripper structure 22. The hydraulic actuators 56 are then activated to move the grapples 51 of the bale grippers 38, 39 into engagement with the ends of the bale B until the bale is squeezed tight enough to be lifted from the ground. The hydraulic actuators 57 are then activated to lift and rotate the bale B, and the hydraulic actuators 58 are activated to continue lifting and rotating the bale. The actuators 57 and 58 can be operated in sequence one after the other, or they can be operated simultaneously with each other.

Once the bale B is positioned over the first platform 23, the bale gripper structure 22 is released to cause the bale to drop onto the first platform 23. If other bales are already located on the first platform 23, the new bale will push the other bales rearwardly as it is moved over the first platform 23. Once the bales reach the inclined second platform 24 behind the first platform 23, they slide rearwardly across the second platform 24 with the rearmost bale engaging the rear stop structure 66 at the rear of the vehicle 20. Additional bales can be lifted and placed on the first platform 23 until the second platform 24 is loaded with a desired number of bales. For example, if the operator desires to create a hay stack four bales high, then four bales will be loaded onto the movable portion 63 of the second platform 24.

After the desired number of bales are loaded on the second platform 24, then the intermediate stops 72, 73 are moved inwardly into the path of movement of the bales along the second platform 24. The intermediate stop members 72, 73 will block additional bales from sliding onto the movable portion 63 of the second platform 24. Additional bales can then be loaded on the first platform 23 and on the stationary portion 62 of the second platform 24 until the vehicle 10 is fully loaded. For example, in one embodiment of the present invention, the bale handling vehicle 10 can be made to hold eight large rectangular bales (e.g., 4'×4'×8' bales), or ten to twelve medium-sized rectangular bales (e.g., 3'×3'×8' bales).

Once the vehicle 10 is loaded, it can be driven to the edge of the field or other desired location and used to stack the hay bales. To stack the bales, the movable portion 63 of the second platform 24 is raised from its inclined position into its vertical position so that the bales on the movable portion 63 are positioned vertically on top of each other. The rear stop structure 66 is then lowered to set the bottom bale on the ground. The vehicle 10 is then driven forward to slide the rear forks 67, 68 out from under the bottom bale.

The vehicle 10 can then be moved a short distance forward and operated to stack the remaining bales carried on the vehicle 10. To accomplish this, the movable portion 63 of the second platform 24 is lowered into its inclined position. The intermediate stop members 72, 73 are then pivoted out of the path of the bales, and the first platform 23 is raised into its inclined position to cause all of the remaining bales to slide to the rear of the vehicle 10 onto the movable portion 63 of the second platform 24. The second platform 24 is then raised to stack the remaining bales adjacent to the first stack. The rear stop structure 66 is again lowered to set the bottom bale on the ground, and the vehicle 10 is driven forward to slide the rear forks 67, 68 out from under the bottom bale. The first and second platforms 23, 24 are then moved to their respective lowered positions and the vehicle 10 can then be used to retrieve additional bales from the field.

Figure 15:
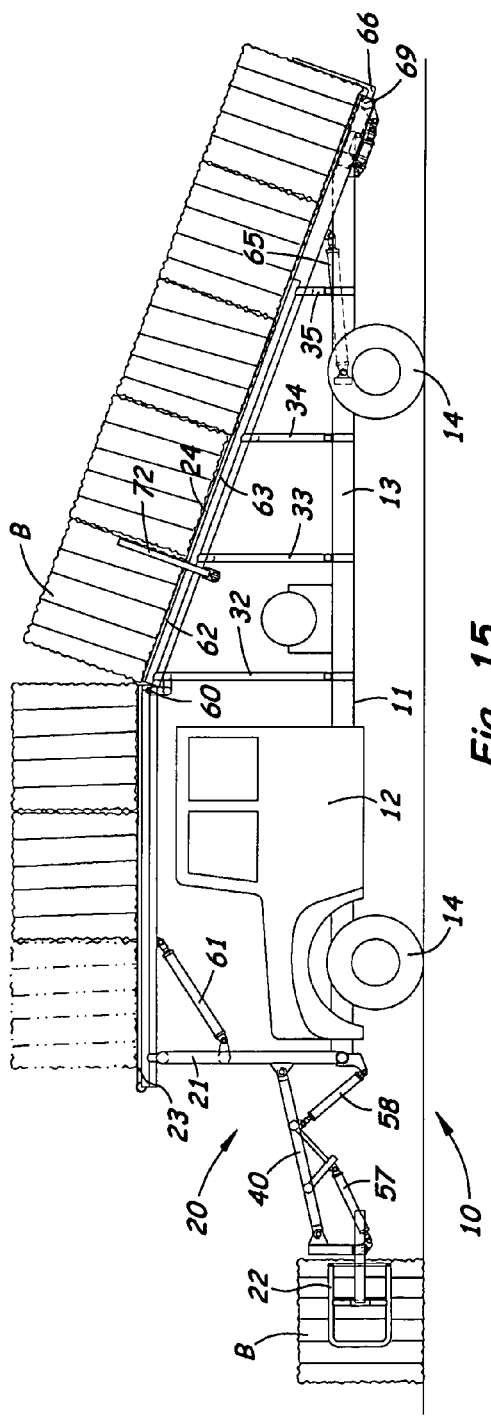
FIG. 15 is an elevation view of a bale handling vehicle handling large round bales according to the present invention.
Figure 16:
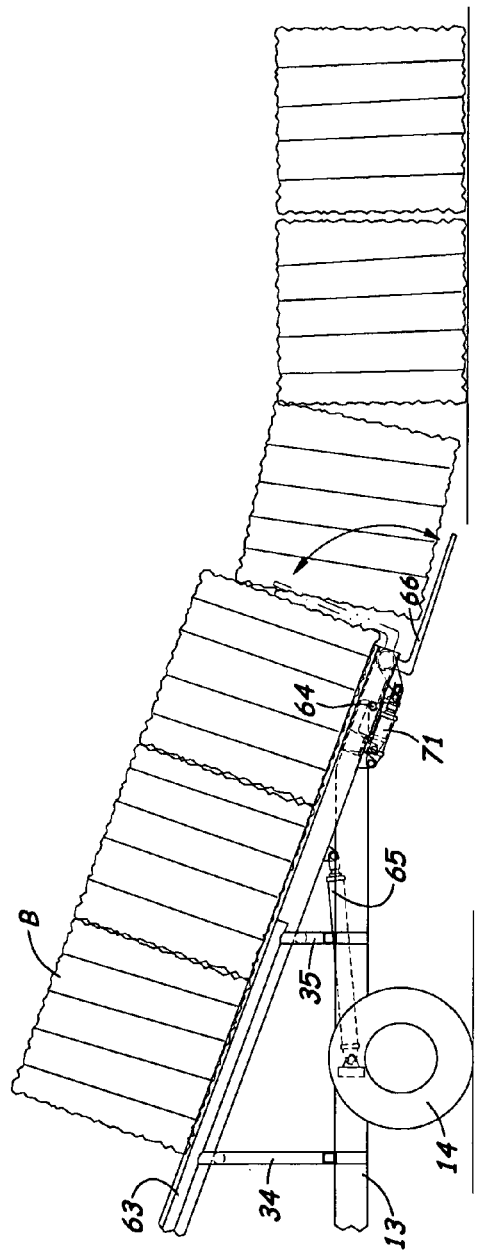
FIG. 16 is a side view of a rear portion of the vehicle showing a plurality of large round bales being unloaded end-to-end in a line.

In an alternative unloading process, the rear forks 67, 68 can be pivoted to a position shown in FIGS. 13 and 16 to allow the bales to simply slide off the rear end of the vehicle 10. This can be used, for example, to unload the vehicle 10 faster when the bales are either not being stacked on the ground or when a separate stacking vehicle is being used (e.g., a loader tractor). As shown in FIGS. 15 and 16, this alternative unloading process is also particularly suitable for handling large round hay bales by placing the bales end-to-end on the first and second platforms 23, 24, and unloading the bales end-to-end in a linear stack at the edge of a field.

While the invention has been specifically described in connection with specific embodiments thereof, it is to be understood that this is by way of illustration and not of limitation, and the scope of the appended claims should be construed as broadly as the prior art will permit.

What is claimed is:

1. A bale handling vehicle, comprising:
   a wheeled chassis and a cab supported by the wheeled chassis;
   a bale gripper structure at the front of the vehicle for picking up bales;
   a first platform located above said cab and being arranged to receive bales deposited by the bale gripper structure, said first platform having a substantially horizontal first position for receiving bales from the bale gripper structure and a second position in which a front end of the first platform is raised so that the first platform is inclined at an angle that causes bales to slide rearwardly across the first platform; and
   a second platform positioned behind the first platform, said second platform having a first position in which said second platform is inclined downwardly from front to rear at an angle substantially the same as the angle of the first platform in its inclined second position for receiving bales from a rear end of the first platform, and a second position in which a movable portion of said second platform is substantially vertical for stacking the bales in a vertical stack on top of each other,
   wherein said first platform is rotatable about a first axis located at a fixed point on the vehicle near a rear end of the first platform, and said first platform is moved from its first position to its second position by raising said front end of the first platform to rotate the first platform about said first axis.

2. The bale handling vehicle according to claim 1, wherein said second platform has a stationary portion and said movable portion, said stationary portion having a front end located adjacent to a rear end of said first platform and a rear end adjacent to said movable portion.

3. The bale handling vehicle according to claim 2, wherein said movable portion of said second platform is rotatable about a second axis located near a rear end of the second platform, and said second platform is moved from its first position to its second position by raising a front end of the movable portion of the second platform to rotate the movable portion of the second platform about said second axis.

4. The bale handling vehicle according to claim 2, wherein said movable portion of said second platform is inclined downwardly from front to rear in its first position and is substantially vertical in its second position.

5. The bale handling vehicle according to claim 1, further comprising a rear stop structure located near the rear end of the second platform.

6. The bale handling vehicle according to claim 5, wherein said rear stop structure is rotatable between a first raised position for preventing bales from sliding off the rear of the second platform and a second lowered position in which bales can be slid off the rear of the second platform for unloading.

7. The bale handling vehicle according to claim 6, wherein said rear stop structure comprises a pair of rear forks that are rotatable relative to the second platform through an angle of approximately 90 degrees or more between said first raised position and said second lowered position.

8. The bale handling vehicle according to claim 6, wherein said rear stop structure is slidable relative to said second platform when the second platform is in its substantially vertical second position to allow the rear stop structure to be lowered to set a bottom bale on the ground when stacking bales in a vertical stack on top of each other.

9. The bale handling vehicle according to claim 6, wherein said rear stop structure is movable between its raised and lowered positions by a hydraulic actuator, and further comprising an accumulator associated with said hydraulic actuator to absorb an impact of a bale sliding into said rear stop structure during operation.

10. The bale handling vehicle according to claim 1, wherein said bale gripper structure comprises a pair of bale grippers supported by a linkage mechanism.

11. The bale handling vehicle according to claim 10, wherein said linkage mechanism has a first actuator for moving the bale grippers toward one another for squeezing a bale therebetween, a second actuator for pivoting the bale grippers about a first transverse axis to lift and rotate the bale approximately 90 degrees, and a third actuator for pivoting the linkage mechanism about a second transverse axis to lift and rotate the bale an additional approximately 90 degrees to a position over said first platform with the first platform in its first position.

12. The bale handling vehicle according to claim 10, wherein said linkage mechanism has a first actuator means for causing the bale grippers to squeeze and self-center a bale relative to the vehicle.

13. The bale handling vehicle according to claim 1, further comprising at least one intermediate stop member that can be moved into a path of movement of the bales along said second platform.

14. The bale handling vehicle according to claim 13, wherein said at least one intermediate stop member comprises a pair of stop members that are rotatable for movement between a first position in which the stop members block movement of bales onto the second platform, and a second position in which the stop members do not block movement of bales onto the second platform.

15. The bale handling vehicle according to claim 13, wherein said at least one intermediate stop member comprises a pair of stop members that rotate about longitudinal axes for pivoting movement in from the sides of the second platform in front of a front end of a movable portion of the second platform.

16. The bale handling vehicle according to claim 13, further comprising a hydraulic system for powering an actuator to selectively move said at least one intermediate stop member.

17. The bale handling vehicle according to claim 1, further comprising a power source for powering the vehicle.

18. The bale handling vehicle according to claim 17, further comprising a hydraulic system for powering actuators to move said bale gripper structure, said first platform, and said second platform.

19. The bale handling vehicle according to claim 17, wherein said second platform is located behind said cab.

20. The bale handling vehicle according to claim 1, wherein the vehicle comprises a retrofitted passenger bus chassis.

21. A method of retrieving bales of agricultural crop material from a field, comprising:
providing a bale handling vehicle having a wheeled chassis, a cab supported by the wheeled chassis, a bale gripper structure at a front of the vehicle for picking up bales, a first platform located above the cab on which bales are deposited by the bale gripper structure, and a second platform positioned behind the first platform, said second platform having a first loading position in which said second platform is inclined at an angle downwardly from front to rear for receiving bales from a rear end of the first platform;
operating the bale gripper structure to grip, rotate, and lift a bale to a position over said first platform, and then to release the bale onto the first platform; and
raising a front end of the first platform by rotating the first platform about an axis located at a fixed point on the vehicle near a rear end of said first platform so that the first platform is inclined downwardly from front to rear at an angle substantially the same as the angle of the second platform in its first loading position to cause the bale to slide rearwardly onto the second platform with said second platform in its inclined first loading position.

22. The method of retrieving bales according to claim 21, further comprising moving the vehicle to an unloading location, and moving a movable portion of the second platform from a first inclined position for receiving bales from a rear end of the first platform to a second substantially vertical position for stacking the bales in a vertical stack on top of each other.

23. The method of retrieving bales according to claim 21, further comprising moving the vehicle to an unloading location, and moving a rear stop structure from a first raised position to a second lowered position to allow bales to be slid off the rear of the second platform for unloading.

* * * * *